(12) United States Patent
Moriwaka et al.

(10) Patent No.: US 8,501,353 B2
(45) Date of Patent: Aug. 6, 2013

(54) NEGATIVE ELECTRODE ACTIVE MATERIAL, NEGATIVE ELECTRODE, AND POWER STORAGE DEVICE

(75) Inventors: Tamae Moriwaka, Kanagawa (JP); Tatsuya Takahashi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 493 days.

(21) Appl. No.: 12/890,841

(22) Filed: Sep. 27, 2010

(65) Prior Publication Data

US 2011/0076566 A1    Mar. 31, 2011

(30) Foreign Application Priority Data

Sep. 30, 2009 (JP) ................................ 2009-226737

(51) Int. Cl.
  *H01M 4/58* (2010.01)
  *H01M 4/13* (2010.01)
(52) U.S. Cl.
  USPC ............... 429/231.95; 429/218.1; 429/231.9; 429/245
(58) Field of Classification Search
  None
  See application file for complete search history.

(56) References Cited

U.S. PATENT DOCUMENTS

| | | | |
|---|---|---|---|
| 5,834,139 A | 11/1998 | Shodai et al. | |
| 6,770,400 B2 | 8/2004 | Tsutsumi et al. | |
| 2010/0086857 A1* | 4/2010 | Higuchi et al. | 429/231.95 |

FOREIGN PATENT DOCUMENTS

| | | |
|---|---|---|
| EP | 0 752 728 A2 | 1/1997 |
| EP | 1 249 881 A2 | 10/2002 |
| JP | 09-035713 | 2/1997 |
| JP | 09-035714 | 2/1997 |
| JP | 2001-202999 | 7/2001 |
| JP | 2002-270174 | 9/2002 |
| JP | 2002-313334 | 10/2002 |
| JP | 2005-135632 | 5/2005 |
| JP | 2005-149906 | 6/2005 |
| JP | 2006-066084 | 3/2006 |

OTHER PUBLICATIONS

International Search Report for PCT/JP2010/066633 dated Dec. 21, 2010.
Written Opinion of the International Searching Authority for PCT/IP2010/066633 dated Dec. 21, 2010.
Lithium Secondary Batteries, pp. 141-142.
6.4.2 Negative Electrode of Nitride, Lithium Secondary Batteries, Mar. 20, 2008, pp. 141-142.

* cited by examiner

*Primary Examiner* — Raymond Alejandro
*Assistant Examiner* — Kwang Han
(74) *Attorney, Agent, or Firm* — Nixon Peabody LLP; Jeffrey L. Costellia (57) ABSTRACT

An object is to improve characteristics of a power storage device and achieve a long lifetime. In the case where a lithium nitride is used for a negative electrode active material of a power storage device, a plurality of lithium nitride layers with different lithium concentrations are stacked. For example, in the case where a first lithium nitride layer and a second lithium nitride layer are stacked over a current collector, lithium is contained in the first lithium nitride layer at a lower concentration than lithium contained in the second lithium nitride layer. In this case, a concentration of a transition metal of the first lithium nitride layer is higher than a concentration of the transition metal of the second lithium nitride layer. Note that another alkali metal may be used instead of lithium.

3 Claims, 6 Drawing Sheets

NEGATIVE ELECTRODE ACTIVE MATERIAL, NEGATIVE ELECTRODE, AND POWER STORAGE DEVICE

TECHNICAL FIELD

The present invention relates to a negative electrode active material provided for a storage battery, a negative electrode including the negative-electrode active material, and a power storage device including the negative electrode.

BACKGROUND ART

In recent years, with the advance of environmental technology, development of power generation devices (e.g., solar power generation devices) which pose less burden on the environment than conventional power generation methods has been actively conducted. Concurrently with the development of power generation devices, development of power storage devices has also been underway.

A lithium ion storage battery is one of power storage devices, for example, a lithium ion storage battery. Lithium ion storage batteries are widely prevalent because their energy density is high and they are suitable for miniaturization. As a material for a negative electrode of a lithium ion storage battery, a material to which lithium can be inserted and from which lithium can be removed is preferable, such as lithium nitride. When a lithium nitride is used as a negative electrode active material, charging and discharging can be performed at low voltage and extremely high specific capacitance can be obtained (see Patent Document 1, for example). Further, as one type of the power storage devices, development of capacitors has also been underway.

REFERENCE

[Patent Document 1] Japanese Published Patent Application No. H09-035714

DISCLOSURE OF INVENTION

However, when a lithium nitride is used as a material for a negative electrode of a power storage device (e.g., lithium ion storage battery), there is a problem in that volume and (or) crystallinity might change in accordance with charging and discharging. When the volume and (or) crystallinity of an electrode change, there is a problem in that characteristics of the power storage device is deteriorated and separation at the interface of a current collector occurs.

An object of one embodiment of the present invention is to improve the characteristics of a power storage device and thus achieve a long lifetime of the power storage device.

One embodiment of the present invention is a negative electrode active material formed using a lithium nitride in a power storage device. The negative electrode active material includes a stack of a first lithium nitride layer represented by $Li_aM_bN_z$ (M is a transition metal; $0.6<a\leq2.4$, $0.6<b\leq2.4$, $0.6\leq z\leq1.4$; that is, a is greater than 0.6 and less than or equal to 2.4, b is greater than 0.6 and less than or equal to 2.4, and z is greater than or equal to 0.6 and less than or equal to 1.4) and a second lithium nitride layer represented by $Li_xM_yN_z$ (M is a transition metal; $0.6<x\leq2.9$, $0.1<y\leq0.6$, $0.6\leq z\leq1.4$; that is, x is greater than 0.6 and less than or equal to 2.9, y is greater than 0.1 and less than or equal to 0.6, and z is greater than or equal to 0.6 and less than or equal to 1.4), where a is less than x and b is greater than y.

One embodiment of the present invention is a negative electrode formed using a lithium nitride in a power storage device. The negative electrode includes a current collector, and a stack of a first lithium nitride layer represented by $Li_aM_bN_z$ (M is a transition metal; $0.6<a\leq2.4$, $0.6<b\leq2.4$, $0.6\leq z\leq1.4$; that is, a is greater than 0.6 and less than or equal to 2.4, b is greater than 0.6 and less than or equal to 2.4, and z is greater than or equal to 0.6 and less than or equal to 1.4) and a second lithium nitride layer represented by $Li_xM_yN_z$ (M is a transition metal; $0.6<x\leq2.9$, $0.1<y\leq0.6$, $0.6\leq z\leq1.4$; that is, x is greater than 0.6 and less than or equal to 2.9, y is greater than 0.1 and less than or equal to 0.6, and z is greater than or equal to 0.6 and less than or equal to 1.4), where a is less than x and b is greater than y.

One embodiment of the present invention is a power storage device including a lithium nitride. The power storage device includes a current collector, a stack of a first lithium nitride layer represented by $Li_aM_bN_z$ (M is a transition metal; $0.6<a\leq2.4$, $0.6<b\leq2.4$, $0.6\leq z\leq1.4$; that is, a is greater than 0.6 and less than or equal to 2.4, b is greater than 0.6 and less than or equal to 2.4, and z is greater than or equal to 0.6 and less than or equal to 1.4) and a second lithium nitride layer represented by $Li_xM_yN_z$ (M is a transition metal; $0.6<x\leq2.9$, $0.1<y\leq0.6$, $0.6\leq z\leq1.4$; that is, x is greater than 0.6 and less than or equal to 2.9, y is greater than 0.1 and less than or equal to 0.6, and z is greater than or equal to 0.6 and less than or equal to 1.4), a positive electrode paired with a negative electrode, and a separator including an electrolyte solution between the positive electrode and the negative electrode, where a is less than x and b is greater than y.

In the above structures which is one embodiment of the present invention, it is preferable that the sum of x and y be close to 3 in a charge state.

Note that M may be one or more kinds of metals. In the case where M includes one kind of metal, any one of cobalt, nickel, and copper may be selected. In the case where M includes plural kinds of metals, at least one or more of cobalt, nickel, and copper are included, and an element of Group 3, an element of Group 4, or an element of Group 5 may be additionally included.

In one embodiment of the present invention with the above structure, the lithium nitride layer may be a stack of three or more layers. In the case where the lithium nitride layer is a stack of three or more layers, with different lithium concentrations, the lithium nitride layer which is on a side closer to the current collector preferably has a lower lithium concentration.

Alternatively, in one embodiment of the present invention with the above structure, the lithium nitride layer is not necessarily a stack of a plurality of lithium nitride layers. (The lithium concentration may be decreased throughout the lithium nitride layer so that the lithium concentration on a side closer to the current collector is lower.

Note that in one embodiment of the present invention with the above structure, another alkali metal may be used instead of lithium.

In one embodiment of the present invention with the above structure, the power storage device may be a storage battery or a capacitor.

The present invention can achieve improvement in the characteristics of a power storage device and a long lifetime of the power storage device.

BEST MODE FOR CARRYING OUT THE INVENTION

Hereinafter, embodiments of the present invention are described with reference to the drawings. However, the present invention is not limited to the following description. It will be readily appreciated by those skilled in the art that various changes and modifications are possible without departing from the spirit and the scope of the present invention. Therefore, the present invention should not be construed as being limited to the description in the following embodiments. Note that reference numerals denoting the same portions are commonly used in different drawings.

Embodiment 1

In this embodiment, a negative electrode active material and a negative electrode including the negative electrode active material, which are embodiments of the present invention, and manufacturing methods thereof will be described with reference to FIGS. 1A to 1D.

The negative electrode active material which is described in this embodiment is formed with a stack of a first lithium nitride layer and a second lithium nitride layer.

The first lithium nitride layer in a charge state is represented by $Li_aM_bN_z$ (M is a transition metal; $0.6 < a \leq 2.4$, $0.6 < b \leq 2.4$, $0.6 \leq z \leq 1.4$; that is, a is greater than 0.6 and less than or equal to 2.4, b is greater than 0.6 and less than or equal to 2.4, and z is greater than or equal to 0.6 and less than or equal to 1.4). The second lithium nitride layer in a charged state is represented by $Li_xM_yN_z$ (M is a transition metal; $0.6 < x \leq 2.9$, $0.1 < y \leq 0.6$, $0.6 \leq z \leq 1.4$; that is, x is greater than 0.6 and less than or equal to 2.9, y is greater than 0.1 and less than or equal to 0.6, and z is greater than or equal to 0.6 and less than or equal to 1.4). It is particularly preferable that x=2.6 and y=0.4.

The first lithium nitride layer in a discharge state is represented by $Li_aM_bN_z$ (M is a transition metal; $0.6 < a \leq 2.4$, $0.6 < b \leq 2.4$, $0.6 \leq z \leq 1.4$; that is, a is greater than 0.6 and less than or equal to 2.4, b is greater than 0.6 and less than or equal to 2.4, and z is greater than or equal to 0.6 and less than or equal to 1.4; preferably, $0.6 < a \leq 1.2$, $1.8 < b \leq 2.4$, $0.6 \leq z \leq 1.4$; that is, a is greater than 0.6 and less than or equal to 1.2, b is greater than 1.8 and less than or equal to 2.4, and z is greater than or equal to 0.6 and less than or equal to 1.4). The second lithium nitride layer in a discharge state is represented by $Li_xM_yN_z$ (M is a transition metal; $0.6 < x \leq 2.9$, $0.1 < y \leq 0.6$, $0.6 \leq z \leq 1.4$; that is, x is greater than 0.6 and less than or equal to 2.9, y is greater than 0.1 and less than or equal to 0.6, and z is greater than or equal to 0.6 and less than or equal to 1.4). Note that a in a discharge state is less than a in a charge state and x in a discharge state is less than x in a charge state. Further, in a charge state, it is preferable that the sum of x and y of the second lithium nitride layer be close to 3.

In the case where the first lithium nitride layer is formed in contact with a current collector, a lithium concentration of the first lithium nitride layer may be lower than a lithium concentration of the second lithium nitride layer, and a concentration of the transition metal included in the first lithium nitride layer may be higher than a concentration of the transition metal included in the second lithium nitride layer (a<x, b>y).

Thus, lithium nitride layers are stacked so that the lithium concentration of the lithium nitride layer which is closer to the current collector is lower, whereby adverse effects due to change in volume and/or crystallinity in accordance with charging and discharging can be reduced. Further, with the above structure, the problem of the negative electrode active material including the lithium nitride separating at the interface with the current collector can be solved. Moreover, with the above structure, characteristics of the power storage device, such as cycle characteristics, can be improved.

Described below is the case where the first lithium nitride layer is formed in contact with the current collector, that is, the case where the lithium concentration of the first lithium nitride layer is lower than the lithium concentration of the second lithium nitride layer.

In order to form the lithium nitride layers, first, a mixture of negative electrode materials is formed. The mixture of the negative electrode materials can be formed as follows: lithium or a substance including lithium, and the transition metal M or a substance including the transition metal M are mixed and then baked at approximately 200° C. to 1000° C. in an inert gas atmosphere or an inert gas atmosphere to which a reducing gas is added. Here, as an example of the substance including lithium, an oxide, a nitride, a halide, a carbonate, an alkoxide, or an organic metal complex thereof can be given, and as an example of the substance including the transition metal M, an oxide, a nitride, a halide, a carbonate, an alkoxide, or an organic metal complex thereof can be given.

Note that M may be one or more kinds of transition metals. In the case where M includes one kind of transition metal, M may be selected from any one of cobalt, nickel, and copper. In the case where M includes a plurality of transition metals, at least one or a plurality of cobalt, nickel, and copper is included, and an element of Group 3, an element of Group 4, or an element of Group 5 may be additionally included.

The mixture of the negative electrode material is mixed with a conductive agent, a binder, or the like and processed into a paste. The paste is applied over a current collector 100 and dried, so that a first negative electrode precursor 102 is formed (see FIG. 1A). The first negative electrode precursor 102 may be pressed to mold as needed.

Note that as the conductive agent, an electron-conductive material which does not cause chemical change in the power storage device may be used. For example, a carbon material such as graphite or carbon fibers, a metal material such as copper, nickel, aluminum, or silver, or a powder or a fiber of a mixture thereof can be used.

Note that as the binder, a polysaccharide such as starch, polyvinyl alcohol, carboxymethyl cellulose, hydroxypropyl-cellulose, regenerated cellulose, or diacetylcellulose, a thermoplastic resin such as poly vinyl chloride, polyvinylpyrrolidone, polytetrafluoroethylene, polyvinylidene fluoride, polyethylene, or polypropylene, or a polymer with rubber elasticity such as ethylene-propylene-diene monomer rubber (EPDM), sulfonated EPDM, styrene-butadiene rubber, butadiene rubber, fluorine rubber, or polyethylene oxide can be used.

Next, description is made for separately forming a lithium nitride layer with a high lithium concentration and a lithium nitride layer with a low lithium concentration. Note that the case where the lithium concentration of the first lithium nitride layer is lower than the lithium concentration of the second lithium nitride layer is described.

Figure 1A:
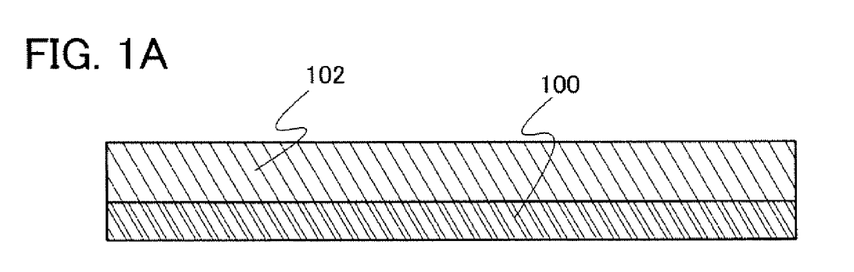
FIGS. 1A to 1D illustrate an example of a method for manufacturing an electrode of one embodiment of the present invention.

First, the first negative electrode precursor 102 is formed over the current collector 100. Then, lithium is removed from the first negative electrode precursor 102. There is no particular limitation on a method for removing lithium. For example, a chemical method or an electrochemical method may be used.

When lithium is electrochemically removed, for example, a redox system may be formed using the first negative electrode precursor 102 formed over the current collector 100, a lithium metal which is to be an opposite electrode to the first negative electrode precursor 102, and nonaqueous electrolyte solution including lithium salt, which should be charged, and then a predetermined voltage is applied.

Figure 1B:
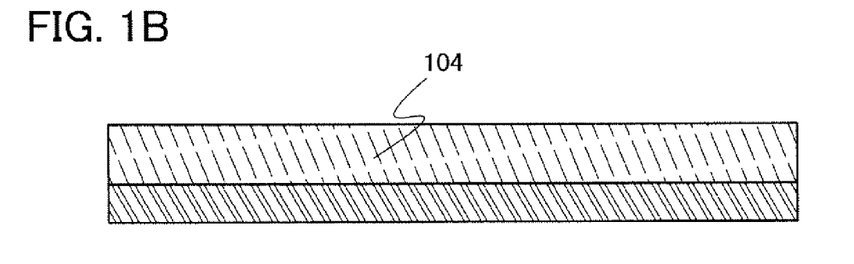
Figure 1C:
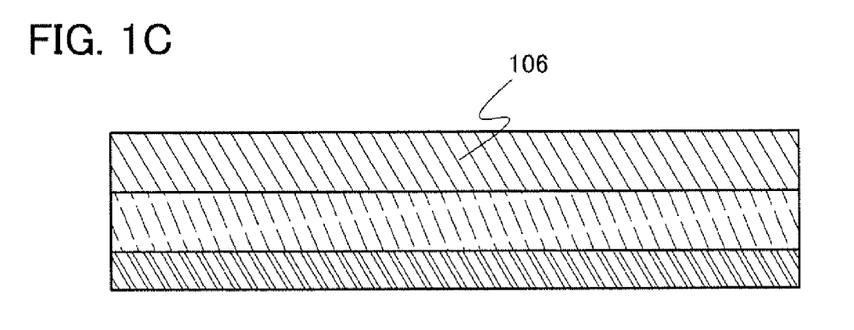
Figure 1D:
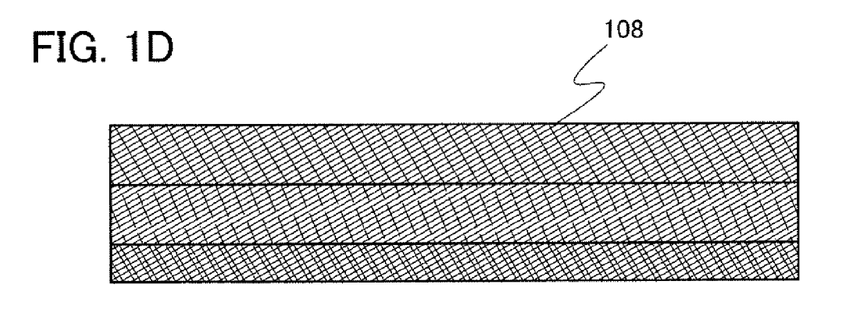

Over a first negative electrode precursor 104 from which lithium has been removed in the above manner (see FIG. 1B), the mixture of the negative electrode material which has been processed into the paste by being mixed with a conductive agent, a binder, or the like is again applied and dried to form a second negative electrode precursor 106 (see FIG. 1C). The second negative electrode precursor 106 is preferably baked and pressed to mold as needed. Thus, a negative electrode 108 can be formed (see FIG. 1D).

Note that press molding performed as needed on the first negative electrode precursor 104 from which lithium has been removed and the second negative electrode precursor 106 may be performed only once either after formation of the first negative electrode precursor 104 from which lithium has been removed or after formation of the second negative electrode precursor 106.

Note that the method of separately forming of the lithium nitride layer with a high lithium concentration and the lithium nitride layer with a low lithium concentration is not limited to the above method. For example, a lithium concentration of the mixture of the negative electrode material included in the paste for forming the first negative electrode precursor 102 may be set to be lower than a lithium concentration of the mixture of the negative material included in the paste for forming the second negative electrode precursor 106 in advance. In this case, removal of lithium is not necessarily performed after formation of the first negative electrode precursor 102.

Alternatively, the first lithium nitride layer and the second lithium nitride layer can be formed by a sputtering method.

In the case where the first lithium nitride layer and the second lithium nitride layer are formed by a sputtering method, a sputtering target is formed by sintering the first negative electrode precursor 102 and the sputtering target is introduced into a sputtering apparatus.

In this case, a rare gas such as an argon gas may be used in the sputtering; alternatively, a nitrogen gas may be used. Further alternatively, a rare gas such as an argon gas and a nitrogen gas may be used in combination.

In the case where the first lithium nitride layer and the second lithium nitride layer are formed by a sputtering method, separate formation of the lithium nitride layer with a high lithium concentration and the lithium nitride layer with a low lithium concentration may be performed by using different sputtering targets. Note that an amorphous lithium nitride layer can be obtained when the lithium nitride layer is formed by a sputtering method.

An embodiment is described where two lithium nitride layers having different lithium concentrations are stacked; however, there is no limitation thereto. Three or more layers may be stacked, or a lithium concentration may be varied throughout the lithium nitride layer so that the lithium concentration on the side closer to the current collector is lower without using a stack of a plurality of layers. An adverse effect due to change in volume and/or crystallinity in accordance with charging and discharging can be reduced by making a lithium concentration lower on the side closer to the current collector, and thus an advantageous effect of the present invention can be obtained. In order that the lithium concentration is gradually changed throughout the lithium nitride layer, a sputtering target having a concentration gradient or a plurality of sputtering targets with different lithium concentrations may be used.

Note that in this embodiment, the case where lithium ions are mainly included as an electrolyte is described; however, there is no limitation thereto and another alkali metal ion may be used.

As described above, the negative electrode active material and the negative electrode including the negative electrode active material can be formed.

The negative electrode active material and the negative electrode including the negative electrode active material, which are described in this embodiment, are used, whereby a power storage device which has preferable characteristics (e.g., cycle characteristics) and a long lifetime can be obtained. Further, yield and reliability can be improved.

Embodiment 2

In this embodiment, a battery which is one embodiment of the present invention and a manufacturing method thereof will be described. As a negative electrode of the battery, the negative electrode described in Embodiment 1 is used.

Figure 2:
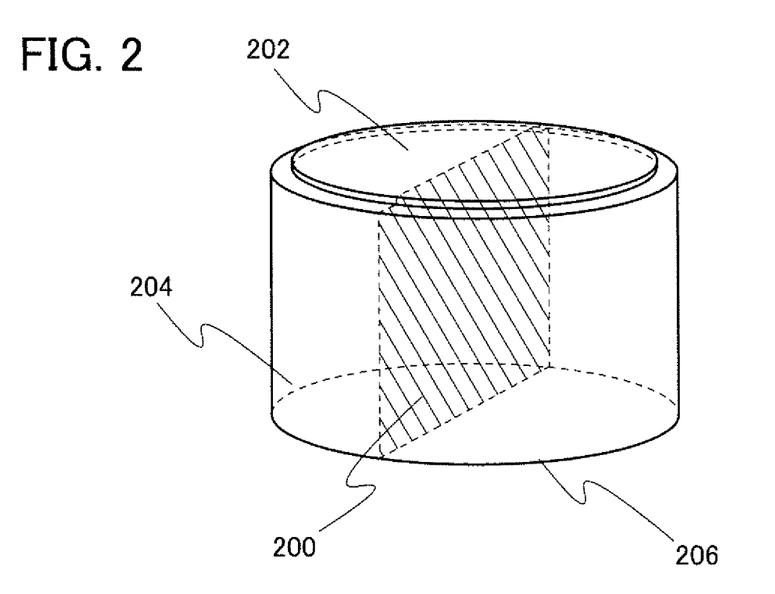
FIG. 2 illustrates an example of a battery of one embodiment of the present invention.

FIG. 2 is a perspective view illustrating an example of a cylindrical storage battery which is one embodiment of the present invention. Note that the present invention is not limited thereto and the storage battery may be angular.

The cylindrical storage battery in FIG. 2 has a closed space surrounded by a battery sidewall 204, a battery cover 202, and a battery bottom 206.

Figure 3:
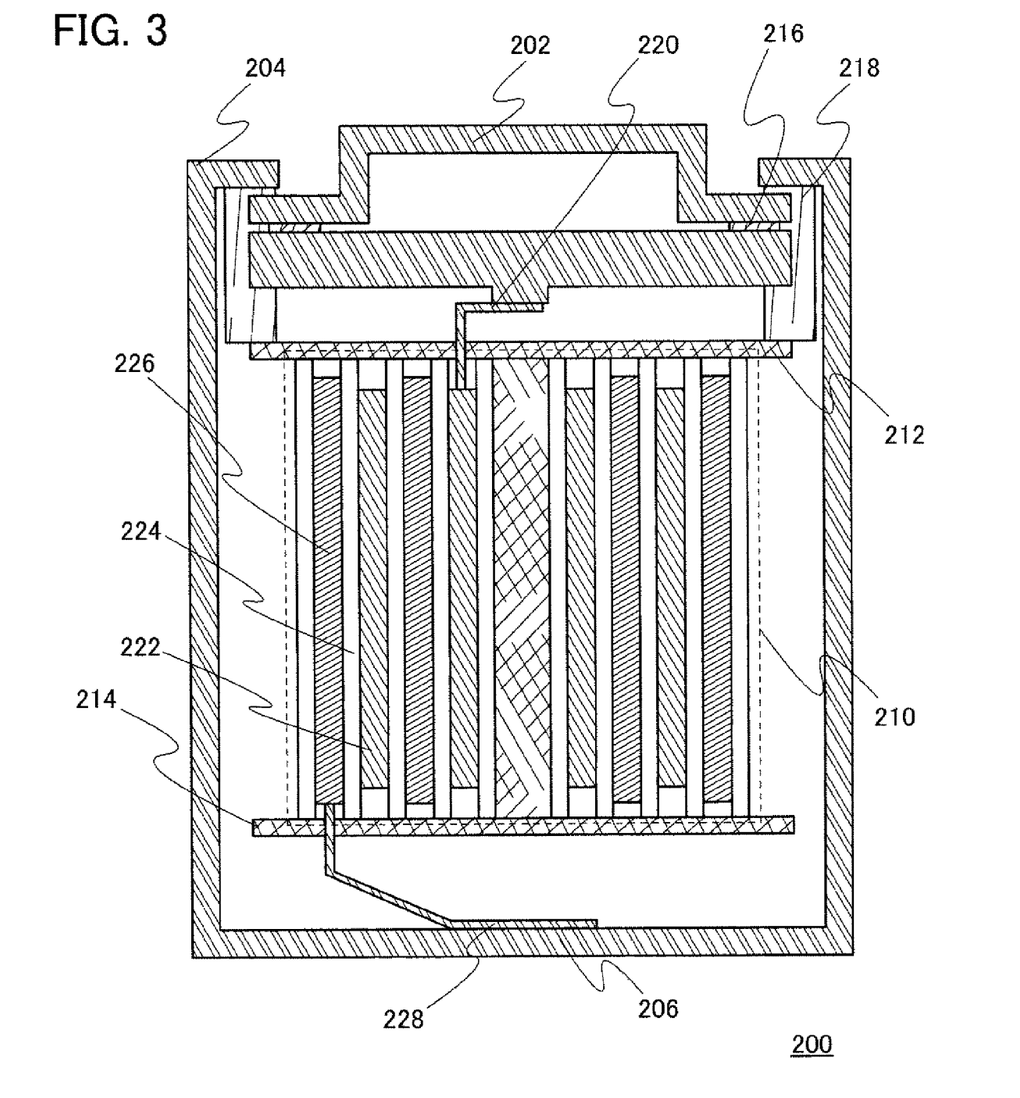
FIG. 3 illustrates an example of a cross section of a battery of one embodiment of the present invention.

FIG. 3 is a cross-sectional view at a cross section 200 of the cylindrical storage battery in FIG. 2.

The battery sidewall 204 and the battery bottom 206 may be formed using a conductive material and an appropriate material may be selected so that the battery sidewall 204 and the battery bottom 206 have appropriate mechanical strength and chemical resistance under the usage environment. For example, an aluminum alloy can be used. The closed space is formed inside the battery surrounded by the battery sidewall 204, the battery bottom 206, and the battery cover 202. An electrode body 210 is placed the closed space, for example. As an example of the electrode body, a wound electrode body illustrated in FIG. 3 can be given.

The electrode body 210 is sandwiched between an insulating plate 212 on an upper portion (the battery cover 202 side) and an insulating plate 214 on a lower portion (the battery bottom 206 side). A conductive wiring 220 and a conductive wiring 228 are drawn out from the insulating plate 212 and the insulating plate 214, respectively. The conductive wiring 220 drawn out from the insulating plate 212 of the upper portion (the battery cover 202 side) is preferably connected to the battery cover 202 through a resistor 216. As the resistor 216, a heat sensitive resistor whose resistance increases as a temperature rises is preferably used. This is for prevention of abnormal heat generation due to excessive current flow. The conductive wiring 228 drawn out from the insulating plate 214 of the lower portion (the battery bottom 206 side) is connected to the battery bottom 206. Note that the battery bottom 206 and the battery sidewall 204 are electrically connected to each other.

The battery sidewall 204, the battery cover 202, and the insulating plate 212 of the upper portion (the battery cover 202 side) are preferably connected to each other through a gasket 218. The gasket 218 preferably has an insulating property; however, there is no limitation thereto and at least the battery cover 202 and the battery sidewall 204 should be insulated from each other.

Although not illustrated, a structure may be employed in which a safety valve is provided inside the battery so that the connection between the battery cover 202 and the electrode body 210 is cut off in the case where a negative electrode 226 and a positive electrode 222 are short-circuited or the battery is heated and the pressure in the battery increases.

Further, a center pin may be inserted in the center of the electrode body 210 in order to fix a position of the electrode body 210.

The electrode body 210 includes the negative electrode 226, the positive electrode 222, and a separator 224 provided therebetween. The positive electrode 222 of the electrode body 210 is electrically connected to the battery cover 202 through the conductive wiring 220. The negative electrode 226 of the electrode body 210 is electrically connected to the battery bottom 206 through the conductive wiring 228.

The positive electrode 222 is preferably formed using a current collector and an active material, as in the negative electrode. For example, a lithium metal containing a composite oxide layer serving as a positive electrode active material may be formed over a positive electrode current collector. Note that another alkali metal may be used instead of lithium.

As the positive electrode active material, a material including both ions serving as carriers and a transition metal can be used, for example. As the material including ions serving as carriers and a transition metal, for example, a material which is represented by a general formula $A_\alpha M_\beta PO_\gamma$ ($\alpha > 0$, $\beta > 0$, $\gamma > 0$) can be used. Here, A represents an alkali metal such as lithium, sodium, or potassium, or an alkaline earth metal such as beryllium, magnesium, calcium, strontium, or barium. M represents, for example, a transition metal such as iron, nickel, manganese, or cobalt. As the material represented by the general formula $A_\alpha M_\beta PO_\gamma$ ($\alpha > 0$, $\beta > 0$, $\gamma > 0$), for example, lithium iron phosphate, sodium iron phosphate, or the like can be given. The material represented by A and the material represented by M may be selected from one or more of each of the above materials. In addition to the above materials, lithium cobaltate, lithium manganate, lithium nickel oxide, or the like can be used.

The positive electrode active material layer may be formed by mixing the positive electrode active material with a conductive agent, a binder, or the like and processed into a paste which is then applied over a current collector. Alternatively, the positive electrode active material layer may be formed by a sputtering method. Pressing may be also performed on the positive electrode active material layer as needed.

Note that titanium, aluminum, or the like can be used far he current collector.

As the separator 224, paper, a nonwoven fabric, a glass fiber, a synthetic fiber such as nylon (polyamide), vinylon (also called vinylon) (a polyvinyl alcohol based fiber), polyester, acrylic, polyolefin, or polyurethane, or the like can be used. However, a material which does not dissolve in an electrolyte solution should be selected.

As the electrolyte solution in which the separator 224 is soaked, for example, a mixture in which lithium hexafluorophosphate ($LiPF_6$) is added to a mixed solution of ethylene carbonate (EC) and diethyl carbonate (DEC) may be used. Further, as the electrolyte, lithium chloride (LiCl), lithium fluoride (LiF), lithium perchlorate ($LiClO_4$), lithium fluoroborate ($LiBF_4$), lithium bis(trifluoromethanesulfonyl)imide ($LiN(SO_2CF_3)_2$), lithium bis(pentafluoroethanesulfonyl)imide ($LiN(SO_2C_2F_5)_2$), lithium trifluoromethansulfonate ($LiCF_3SO_3$), or the like can be used. Furthermore, in the case where an alkali metal ion other than a lithium ion is used, sodium chloride (NaCl), sodium fluoride (NaF), sodium perchlorate ($NaClO_4$), sodium fluoroborate ($NaBF_4$), potassium chloride (KCl), potassium fluoride (KF), potassium perchlorate ($KClO_4$), potassium fluoroborate ($KBF_4$), or the like can be used, one or more of which may be dissolved in a solvent.

Examples of the solvent include the following: cyclic carbonates such as propylene carbonate (PC), butylene carbonate (BC), and vinylene carbonate (VC); acyclic carbonates such as dimethyl carbonate (DMC), ethylmethyl carbonate (EMC), methylpropyl carbonate (MPC), methylisobutyl carbonate (MIBC), and dipropyl carbonate (DPC); aliphatic carboxylic acid esters such as methyl formate, methyl acetate, methyl propionate, and ethyl propionate; γ-lactones such as γ-butyrolactone; acyclic ethers such as 1,2-dimethoxyethane (DME), 1,2-diethoxyethane (DEE), and ethoxymethoxy ethane (EME); cyclic ethers such as tetrahydrofuran and 2-methyltetrahydrofuran; dimethylsulfoxide; 1,3-dioxolane; alkyl phosphate esters such as trimethyl phosphate, triethyl phosphate, and trioctyl phosphate and fluorides thereof. These materials can be used either alone or in combination.

Note that the case where lithium ions are mainly included in the electrolyte solution is described in this embodiment; however, there is no limitation thereto and another alkali metal ion may be used.

Note that also in this embodiment, the lithium nitride layer may include three or more layers; alternatively, the lithium concentration may be gradually decreased throughout the lithium nitride layer so that the lithium concentration on the side closer to the current collector is lower without using a stack of a plurality of layers.

As described above, a battery can be manufactured using the electrode described in Embodiment 1 as the negative electrode.

The battery described in this embodiment has preferable characteristics (e.g., cycle characteristics), a long lifetime, and high reliability. Moreover, the battery can be manufactured with high yield.

Embodiment 3

In this embodiment, a capacitor which is one embodiment of the present invention and a manufacturing method thereof will be described. As for a negative electrode of the capacitor, the negative electrode described in Embodiment 1 is used.

Figure 4A:
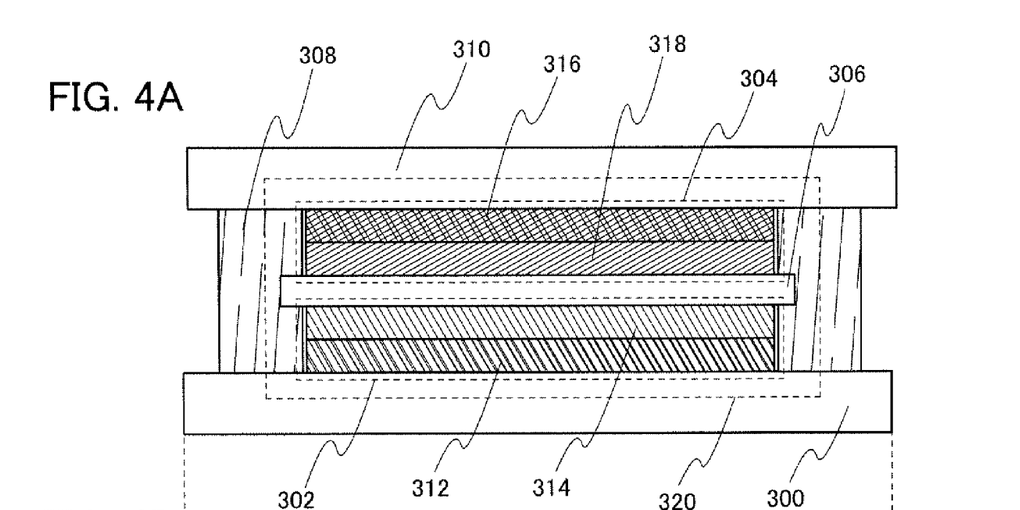
FIGS. 4A and 4B illustrate an example of a cross section and a top surface of a capacitor of one embodiment of the present invention.
Figure 4B:
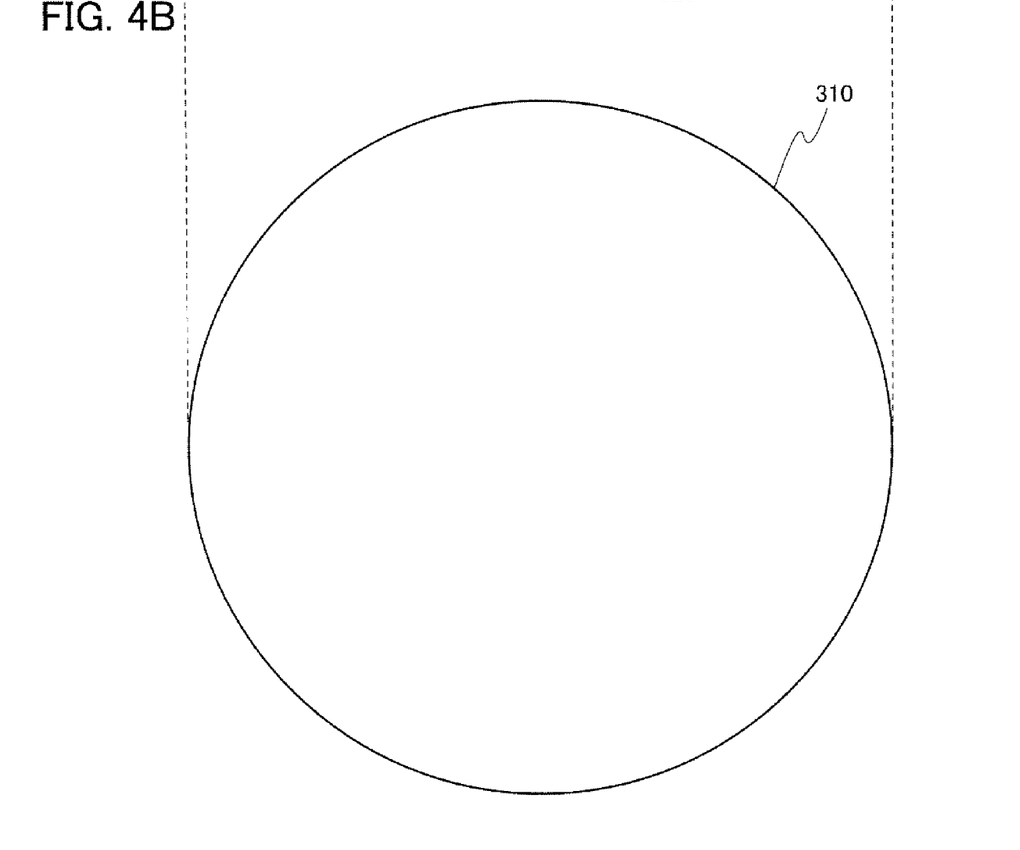

FIG. 4A is a cross-sectional view of one example of the capacitor which is one embodiment of the present invention and FIG. 4B is a top view thereof. In the capacitor in FIGS. 4A and 4B, an electrode body 320 is sandwiched between a bottom cover 300 and a top cover 310. The electrode body 320 is placed in a closed space formed by the bottom cover 300, the top cover 310, and, for example, a gasket 308. Although a cylindrical battery is illustrated in FIGS. 4A and 4B, the battery may be angular.

The electrode body 320 includes a positive electrode 302, a negative electrode 304, and a separator 306 provided therebetween. The positive electrode 302 includes a positive electrode current collector 312 and a positive electrode active material layer 314. The negative electrode 304 includes a negative electrode current collector 316 and a negative electrode active material layer 318.

The positive electrode current collector 312 of the positive electrode 302 can be formed using a material and a manufacturing method similar to those of the current collector of the positive electrode 222 in Embodiment 2.

The positive electrode active material layer 314 of the positive electrode 302 can be formed using activated carbon, carbon nanotube, fullerene, polyacene, or the like. The positive electrode active material layer 314 may be formed, for example, by placing activated carbon serving as a positive electrode active material over the current collector.

First, the activated carbon serving as a positive electrode active material, acetylene black, and polyvinylidene fluoride are mixed at a ratio of 79:5:16, and the mixture is soaked in N-methylpyrrolidone (NMP) and stirred to form a paste. Then, the paste is applied over the current collector and dried; thus, a positive electrode active material layer can be formed. Pressing is also preferably performed on the positive electrode active material layer as needed.

The negative electrode current collector 316 of the negative electrode 304 can be formed using a material and a manufacturing method similar to those of the current collector of the negative electrode 226 in Embodiment 2.

The negative electrode active material layer 318 of the negative electrode 304 can be formed using a material similar to and by a manufacturing method similar to the negative electrode active material layer of the negative electrode 226 in Embodiment 2.

That is, the negative electrode described in Embodiment 1 can be used as the negative electrode 304.

Note that although the gasket 308 preferably has an insulating property, there is no limitation thereto and any structure may be employed as long as the positive electrode 302 and the negative electrode 304 do not short-circuit.

Note that the electrolyte solution filling the closed space may be similar to the one used in Embodiment 2.

Figures 5A, 5B:
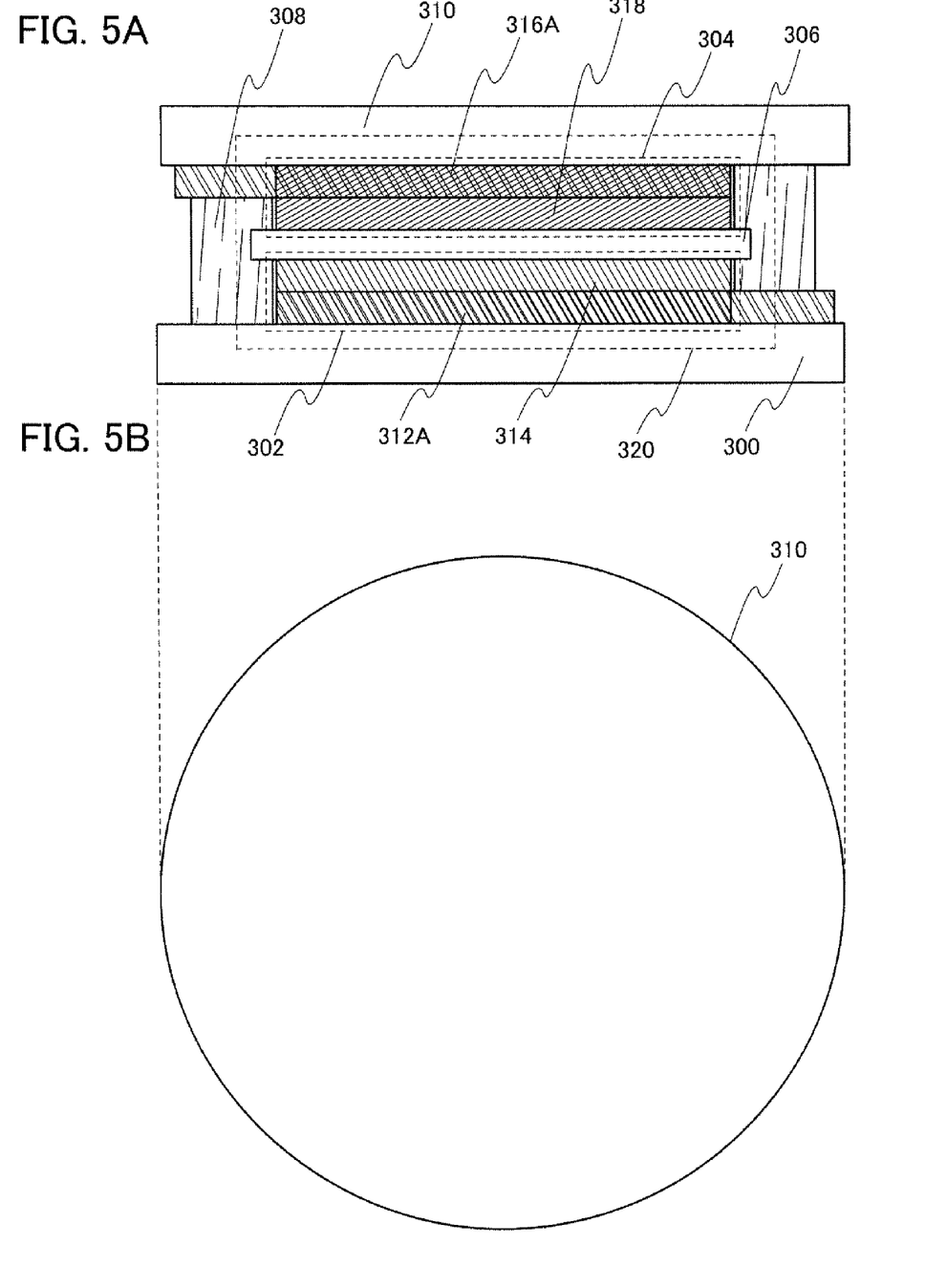
FIGS. 5A and 5B illustrate an example of a cross section and a top surface of a capacitor of one embodiment of the present invention.

Although a conductive wiring for connecting the positive electrode 302 and the negative electrode 304 to an outside is not illustrated in FIGS. 4A and 4B, the positive electrode 302 and the negative electrode 304 may be drawn outside using, for example, as illustrated in FIGS. 5A and 5B, a positive electrode current collector 312A of the positive electrode 302 and a negative electrode current collector 316A of the negative electrode 304 extend out from the electrode body 320 in directions opposite to each other.

Figure 6A:
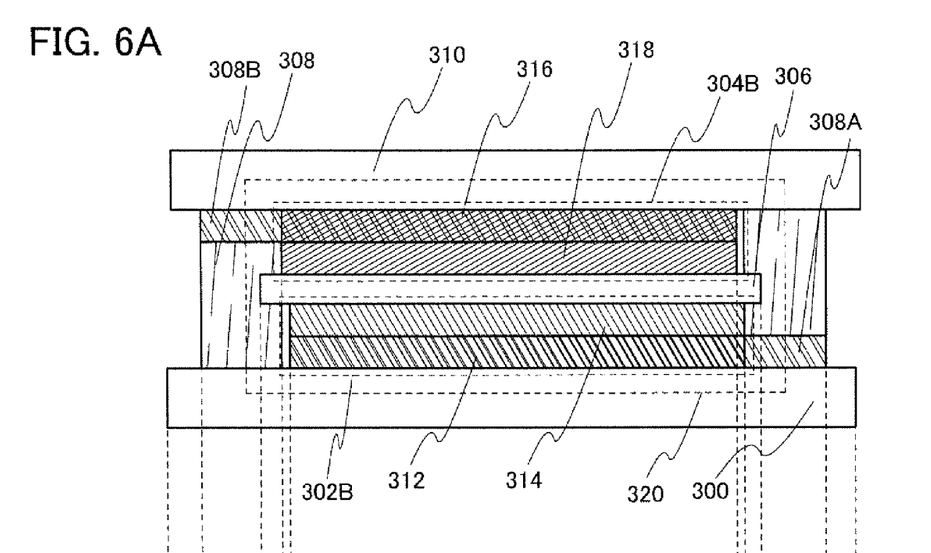
FIGS. 6A and 6B illustrate an example of a cross section and a top surface of a capacitor of one embodiment of the present invention.
Figure 6B:
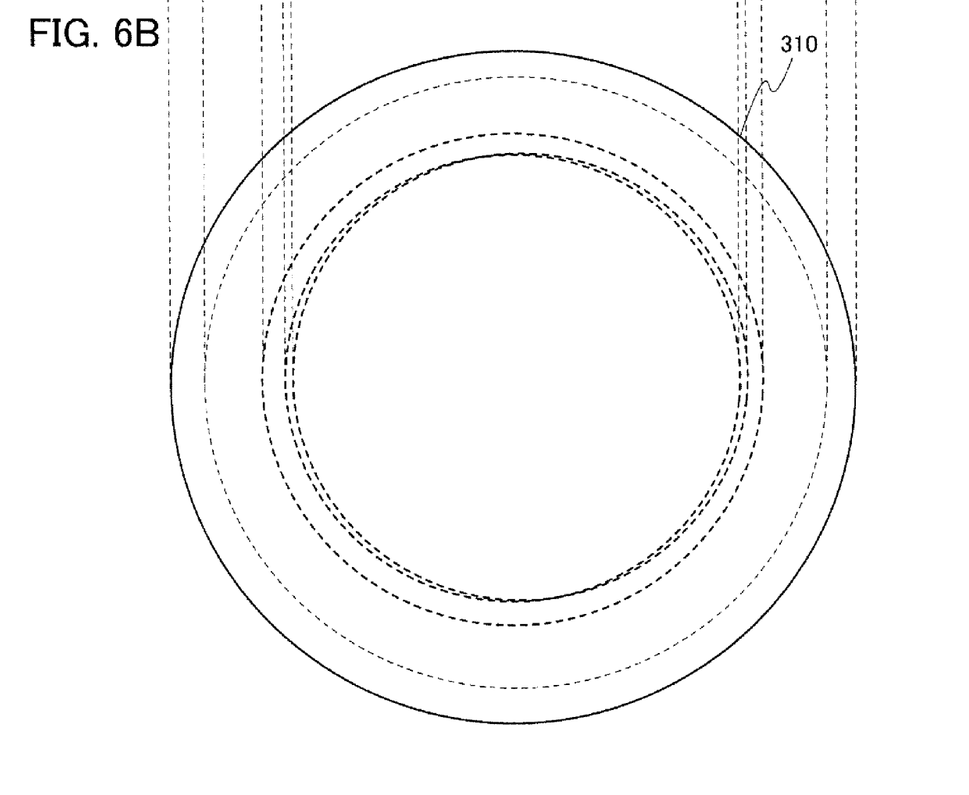

Alternatively, as illustrated in FIGS. 6A and 6B, part of the gasket 308 may be formed using a conductive material. For example, a conductive portion 308A may be provided on the bottom cover 300 side of the gasket 308 and connected to the positive electrode 302B, and a conductive portion 308B may be provided on the top cover 310 side of the gasket 308 and connected to the negative electrode 304B.

Although the case where the bottom cover 300 and the top cover 310 are formed using an insulating material is described, there is no limitation thereto and the bottom cover 300 and the top cover 310 may be formed using an aluminum alloy, for example. In this case, the bottom cover 300 and the top cover 310 may be insulated by the gasket 308.

As described above, a capacitor can be manufactured using the electrode described in Embodiment 1 as the negative electrode.

The capacitor described in this embodiment has preferable characteristics (e.g., cycle characteristics), a long lifetime, and high reliability. Moreover, the capacitor can be manufactured with high yield.

This application is based on Japanese Patent Application serial no. 2009-226737 filed with Japan Patent Office on Sep. 30, 2009, the entire contents of which are hereby incorporated by reference.

EXPLANATION OF REFERENCE

100: current collector, 102: first negative electrode precursor, 104: first negative electrode precursor from which lithium is removed, 106: second negative electrode precursor, 108: negative electrode, 200: cross section, 202: battery cover, 204: battery sidewall, 206: battery bottom, 210: electrode body, 212: insulating plate, 214: insulating plate, 216: resistor, 218: gasket, 220: conductive wiring, 222: positive electrode, 224: separator, 226: negative electrode, 228: conductive wiring, 300: bottom cover, 302: positive electrode, 302B: positive electrode, 304: negative electrode, 304B: negative electrode, 306: separator, 308: gasket, 308A: conductive portion, 308B: conductive portion, 310: top cover, 312: positive electrode current collector, 312A: positive electrode current collector, 314: positive electrode active material layer, 316: negative electrode current collector, 316A: negative electrode current collector, 318: negative electrode active material layer, and 320: electrode body.

The invention claimed is:

1. A negative electrode active material including a lithium nitride of a power storage device, comprising:
   a stack including:
      a first lithium nitride layer represented by $Li_aM_bN_z$ wherein M is a transition metal; $0.6<a\leq2.4$, $0.6<b\leq2.4$, $0.6\leq z\leq1.4$; and
      a second lithium nitride layer represented by $Li_xM_yN_z$ wherein M is a transition metal; $0.6<x\leq2.9$, $0.1<y\leq0.6$, $0.6\leq z\leq1.4$,
   wherein a is less than x and b is greater than y.

2. A negative electrode including a lithium nitride of a power storage device, comprising:
   a current collector; and
   a stack including:
      a first lithium nitride layer represented by $Li_aM_bN_z$ wherein M is a transition metal; $0.6<a\leq2.4$, $0.6<b\leq2.4$, $0.6\leq z\leq1.4$; and
      a second lithium nitride layer represented by $Li_xM_yN_z$ wherein M is a transition metal; $0.6<x\leq2.9$, $0.1<y\leq0.6$, $0.6\leq z\leq1.4$,
   wherein a is less than x and b is greater than y.

3. A power storage device including a lithium nitride, comprising:
   a current collector;
   a stack including:
      a first lithium nitride layer represented by $Li_aM_bN_z$ wherein M is a transition metal; $0.6<a\leq2.4$, $0.6<b\leq2.4$, $0.6\leq z\leq1.4$; and
      a second lithium nitride layer represented by $Li_xM_yN_z$ wherein M is a transition metal; $0.6<x\leq2.9$, $0.1<y\leq0.6$, $0.6\leq z\leq1.4$;
   a positive electrode paired with a negative electrode; and
   a separator including an electrolyte solution between the positive electrode and the negative electrode,
   wherein a is less than x and b is greater than y.

* * * * *